United States Patent Office 2,697,119
Patented Dec. 14, 1954

2,697,119
PROCESS FOR CHLORINATION OF DIETHYL ETHER

Everett E. Gilbert, Flushing, Julian A. Otto, Long Island City, and Benjamin Veldhuis, Bayside, N. Y., assignors to Allied Chemical & Dye Corporation, New York, N. Y., a corporation of New York No Drawing. Application April 6, 1949,
Serial No. 85,934

5 Claims. (Cl. 260—601)

This invention relates to the chlorination of ether and is particularly concerned with the conversion of ether to dichloracetaldehyde alcoholate and chloral.

In the past, chloral has been manufactured commercially by chlorination of alcohol. This reaction, however, is slow, hazardous, and of a highly complex nature, requiring careful control and handling to obtain satisfactory yields of chloral. While it has been proposed to prepare chloral from diethyl ether by chlorination, yields of the desired product have generally been so small and the chlorination procedure has been so hazardous that the process has never been commercialized. As is well known, chloral is the organic raw material employed in preparing the important insecticide DDT (p,p' dichlorodiphenyl-1,1,1-trichloroethane). DDT is produced by reacting chloral with chlorobenzene in the presence of sulfuric acid. In addition to its use as an intermediate in the production of chloral, dichloracetaldehyde alcoholate is used for making the insecticide di(p-chlorophenyl) dichloroethane.

It is an object of the present invention to provide an improved process for the chlorination of ether. Another object is to produce dichloracetaldehyde alcoholate and chloral in high yields by the chlorination of diethyl ether. A further object of the invention is to provide simple liquid phase processes minimizing explosion hazards and adapted for either batch or continuous operation. Yet another object of the invention is to provide procedure involving continuous operation for production of chloral under optimum yield conditions by chlorination of diethyl ether. The invention further aims to produce conversion of dichloracetaldehyde alcoholate to chloral in good yield. Further objects of the invention will be apparent from the following detailed description thereof.

In accordance with the invention, the chlorination of ether may be carried out with facility and with production of high yields of the desired chlorinated products by reacting the ether with chlorine and an equimolar quantity of water in a reaction mixture at 50–130° C. saturated with chlorine and containing as solvent a chlorinated oxyethane compound having not more than 6 carbon atoms and 0 to 5 mols of water per mol of such chlorinated oxyethane compounds in addition to the aforementioned equimolar quantity of water to ether required for reaction. The chlorine concentration may be maintained by gradual or intermittent addition of chlorine along with or alternately with additions of ether. The one mol of water required for reaction with each mol of ether may be added initially to the solvent prior to introduction of ether and chlorine. However, such water necessary for reaction with the ether, as well as certain additional preferred quantities of water as hereinafter specified, is more desirably introduced into the reaction mixture also by gradual or intermittent addition along with or alternately with the chlorine and ether, the reaction mixture being anhydrous or containing up to 5 mols of water per mol of chlorinated oxy ethane compounds employed as solvent. By carrying out the process in the manner prescribed above, chlorination of the ether takes place rapidly with a minimum of side reactions, resulting in high yields of the desired product. The chief products produced in accordance with the process are chloral and dichloracetaldehyde alcoholate.

Both anhydrous ether and commercial or technical ether containing water may be employed with allowance made in the latter case for water content in relation to the water employed in chlorination. The ether may be added gradually to the reaction mixture by passing it in liquid phase into the body of the reaction mixture or by passing it in vapor phase into the reaction mixture either alone or mixed with an inert gas such as nitrogen or carbon dioxide.

The chlorinated oxy ethane compounds employed as solvents for the process may contain from 2 to 6 carbon atoms. Suitable solvents of this type include chlorine substitution products of ethyl alcohol, diethyl ether, acetaldehyde, acetaldehyde acetal, acetaldehyde alcoholate $$(CH_3CH-OC_2H_5)$$
$$|$$
$$OH$$

acetic acid and ethyl acetate. Examples of specific compounds suitable as solvents, in accordance with the above, are $CH_2ClCH_2OH$, $CHCl_2CH_2OH$, $CH_3CHClOC_2H_5$ $CH_2ClCHClOC_2H_5$, $CHCl_2CHClOC_2H_5$ $CCl_3CHClOC_2H_5$, $CH_2ClCHO$, $CHCl_2CHO$ $CCl_3CHO$, $CH_2ClCH(OC_2H_5)_2$, $CHCl_2CH(OC_2H_5)_2$ $CCl_3CH(OC_2H_5)_2$ $$CH_2ClCHOC_2H_5$$
$$|$$
$$OH$$

$$CHCl_2CHOC_2H_5$$
$$|$$
$$OH$$

$$CCl_3CHOC_2H_5$$
$$|$$
$$OH$$

$CH_2ClCOOH$, $CHCl_2COOH$, $CCl_3COOH$ $CH_2ClCOOC_2H_5$, $CHCl_2COOC_2H_5$, and $CCl_3COOC_2H_5$ The preferred solvents are chloral and dichloracetaldehyde alcoholate, the principal products of our process, the dichloracetaldehyde alcoholate usually being employed in the form of mixtures with monochloracetaldehyde alcoholate, such mixtures predominating in the dichlor compound. Acetic acid may be used as solvent for the process, but when this solvent is used, it becomes chlorinated so that the actual solvent present during the reaction is a mixture of chlorinated acetic acids. The solvent may be recovered from the reaction mixture and used for succeeding charges of reactants. Thus, when acetic acid or mono- or dichloracetic acid is employed initially, the final solvent after several cycles may be primarily trichloracetic acid together with chloral resulting from the reaction taking place in the reaction mass. If dichloracetaldehyde is employed initially as solvent in making chloral, the final solvent may be substantially its chlorinated derivative, namely, chloral. Further, if the above noted chlorinated acetaldehyde alcoholates should be employed as solvent, the final solvent may be chloral, since such alcoholates, as pointed out hereinafter, are intermediate partial chlorination products in the chlorination of ether to chloral in accordance with the invention. The amount of solvent employed is not critical. Generally, the chlorine, ether and water are introduced into a relatively large body of the solvent.

Throughout the reaction period, the chlorine available for reaction is generally maintained in excess of the theoretical amount required to react with the ether starting material present for obtaining the desired product. For example, in production of chloral according to the equation,

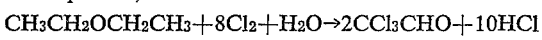
$CH_3CH_2OCH_2CH_3 + 8Cl_2 + H_2O \rightarrow 2CCl_3CHO + 10HCl$ 8 mols of chlorine per mol of diethyl ether are theoretically required as the minimum proportion of chlorine necessary to form chloral. In practice of the invention an excess of chlorine is preferably employed, the amount of chlorine utilized ranging from 8 upwards to as high as and beyond 15 mols per mol of ether, depending upon the efficiency of operation. Aside from economic considerations, there is no critical upper limit of excess chlorine which may be employed. In good commercial operation, the amount of chlorine utilized ranges about 8 to 10 mols per mol of ether. In the preparation of dichloracetaldehyde alcoholate from diethyl ether in accordance with the invention, at least 3 mols of chlorine are required per mol of ether as shown by the probable course of the reaction noted below:

$$CH_3CH_2OC_2H_5 + 2Cl_2 \rightarrow CH_2ClCHClOC_2H_5 + 2HCl$$
$$CH_2ClCHClOC_2H_5 + H_2O \rightarrow CH_2ClCH(OH)OC_2H_5 + HCl$$
$$CH_2ClCH(OH)OC_2H_5 + Cl_2 \rightarrow CHCl_2CH(OH)OC_2H_5 + HCl$$

In general, however, from 3 to 7 mols of chlorine per mol of ether are utilized in the above reaction for making dichloracetaldehyde alcoholate. Usually, in accordance with our process, the solvent is first saturated with chlorine prior to introduction of the ether. As applied particularly to batch operation in production of chloral, after the solvent is thus saturated, a portion of the chlorine is gradually added along with the ether and water while the remainder of the chlorine is added after all the ether has been introduced, to complete chlorination to chloral.

As already noted and indicated in the above equations, one mol of water is required for reaction with each mol of ether starting material in production of both dichloracetaldehyde alcoholate and chloral. While one mol of water per mol of ether is theoretically all that is necessary for carrying out the reaction, in a more satisfactory embodiment of the invention process, water in addition to that which reacts chemically with the ether is included in the reaction mixture. On the basis of our development work, we have noted that the presence in the reaction mixture of up to 5 mols of water per mol of chlorinated oxy ethane compounds employed as solvent, in addition to the equimolar quantity of water to ether required for reaction, promotes rapid chlorination with a minimum of side reactions and avoidance of explosion hazards, particularly when using diethyl ether as starting material. In this connection we have noted best results to be obtained when the quantity of water in the solvent, above that required for reaction, is maintained within the range of about 0.5 to 3 mols per mol of chlorinated oxy ethane solvent material. We believe the excess of water above that chemically taking part in the chlorination functions catalytically to produce good yields of the desired chlorinated products and to achieve the other desirable effects above mentioned.

While as heretofore noted, the one mol of water per mol of ether necessary for reaction may be furnished by the water which may be present in the reaction mixture, thus necessitating addition of only the ether and chlorine to the reaction mixture containing the chlorinated oxy ethane solvent and water, in preferred practice of the invention, such one mol of water per mol of ether, desirably along with additional catalytic quantities of water, is introduced into the reaction mixture by gradual or intermittent addition, along with or alternately with the ether and chlorine. Accordingly, we have found that addition of the ether starting material, chlorine and 1 to 5 mols of water per mol of ether gradually to a reaction mixture saturated with chlorine and containing as solvent a chlorinated oxy ethane compound having not more than 6 carbon atoms, and from 0 to 5 mols of water per mol of chlorinated oxy ethane compounds, constitutes a commercially practical mode of operation of the process and is considered a preferred embodiment thereof. As regards production of chloral, the quantity of water added to the reaction mixture with the ether preferably ranges from 2 to 4 mols per mol of ether.

Although the amount of water added to the reaction mixture with the ether is preferably in excess of the one mol required for reaction with each mol of ether in preparing dichloracetaldehyde alcoholate or chloral, it is noted that introduction of such excess water into the reaction mixture is controlled so that throughout the reaction period, the quantity of water present in the reaction mass does not exceed the above noted 5 mols per mol of chlorinated oxy ethane solvent material, e. g. chloral. Preferably, such introduction of excess water is adjusted so as to maintain a proportion of 0.5 to 3 mols of water per mol of solvent in the reaction mixture during chlorination. From the foregoing, it is apparent that the water which acts catalytically, like the one mol of water per mol of ether which reacts chemically, may be added initially to the solvent prior to introduction of chlorine and ether, or it may be added to the reaction mixture along with the ether and chlorine. Preferably, however, a portion of such catalytically acting water is furnished by water initially introduced into the reaction mixture prior to addition of chlorine and ether, while a portion is provided by introduction of water into the reaction mixture together with the chlorine and the ether starting material.

In the preferred mode of procedure for chlorinating ether in accordance with the invention, water in quantity up to 5 mols per mol of chlorinated oxy ethane compounds employed as solvent is added to the anhydrous solvent material prior to introduction of ether and chlorine. The amount of water thus initially added to the solvent may vary considerably. However, when solvents which form monohydrates, e. g. dichloracetaldehyde or chloral, are employed, sufficient water to form the corresponding hydrate, i. e. about one mol per mol of solvent, is usually first added. In calculating the amount of water present in the reaction mixture, such water is intended to include any water of hydration present in the solvents employed.

The water being introduced into the reaction mixture during introduction of the ether may be added to the ether or it may be added in vapor form to the chlorine prior to introduction of the ether or chlorine into the solvent. Preferably, however, the water is added separately to the reaction mixture during addition of the other reactants.

As regards particularly batch operation, the desired amount of water, in addition to that which may be present in the reaction mixture, may be added thereto with all the necessary chlorine during ether addition, although for best results in production of chloral, the major portion of such added water may be introduced into the reaction mixture during ether addition with the remainder introduced during continued addition of chlorine after all the ether has been added. Thus, in a preferred manner for making chloral in a batch procedure, diethyl ether, chlorine and water in a ratio of about 4 to 8 mols of chlorine and about 1 to 3 mols of water per mol of ether are added gradually in a period of about 6 to 12 hours to chloral as solvent containing 0.5 to 3 mols of water per mol of chloral, with addition of chlorine and water thereafter continued in a proportion of 4 to 10 mols of chlorine and 1 to 2 mols of water per mol of ether for 20–30 hours.

Temperatures of the reaction mixture for production of chloral in accordance with the process may vary within the range of 50°–130° C. In preferred operation, however, temperatures are in the range of 60°–110° C. and for best operation vary from 75°–95° C. Use of such comparatively high temperatures in our chlorination process results in shortening reaction time while at the same time bringing about increased yields. The pressure in the reaction mixture is usually maintained at about atmospheric, although lower or higher pressures are suitable. By using a closed system under superatmospheric pressure, reaction temperatures over 110° C. may be attained.

While reaction time is not critical in the instant process, usually from 20–50 hours are required for complete chlorination to chloral. In batch operation ordinarily a period of 6 to 12 hours is required during addition of ether, chlorine and water, and the remainder of the period utilized for additional introduction of chlorine to complete the reaction. Constant agitation should be maintained in the reaction mixture to prevent local overheating and high concentrations of ether. Such agitation may be effected by passing the ether, when used in vapor phase, with an inert gas, e. g. nitrogen, into the reaction mixture, the inert gas bubbling through the mixture to agitate the latter; or the chlorine may be introduced in the form of a gas near the bottom of the reaction mixture and the HCl liberated in the reaction, in rising through the liquid, provides sufficient agitation to maintain the homogeneity of the mixture. However, mechanical agitation may be employed for this purpose if desired. Use of packing in a reaction column also provides excellent mixing of the reactants. The instant chlorination process is normally carried out under reflux to permit the evolved HCl, excess chlorine and small amounts of low boiling by-products, e. g., ethyl chloride, to escape while returning vapors of ether, chlorinated ether products and water to the reaction mixture.

The crude reaction mixture containing chloral obtainable by the process of the invention may be employed directly without purification to produce DDT, if it is not essential to prepare DDT of high purity. However, to obtain purified chloral for use in preparation of DDT of high purity, the chloral obtained in our process may be separated from the reaction mixture by distillation. Thus, chloral (B. P. 98° C.) may be separated from any high boiling solvents which may have been employed, e. g. chlorinated acetic acids, by distilling off the reaction product at normal pressure up to a temperature of about 100° C., leaving the higher boiling chlorinated acetic acids and small amounts of higher boiling by-products as still residue. Such chlorinated acetic acids may then be reused as solvent in a succeeding chlorination. However, since a preferred solvent is chloral, also the product of the reaction, a portion of the chloral produced in the process may be re-cycled as solvent for subsequent chlorinations. In the practice of our process it has been found that yields of chloral as high as 70–75% of theory based on ether starting material may be obtained.

The dichloracetaldehyde alcoholate which may also be produced in accordance with our process, may be separated from the crude reaction mixture by distillation to obtain the pure compound. However, when this compound is to be employed to produce chloral by further chlorination as hereinafter more fully described, the crude reaction mixture is employed directly without purification.

While in accordance with the invention as above described, chloral may be produced directly in a single stage chlorination from the ether starting material, we have found that initial partial chlorination of the ether takes place rapidly while final chlorination of the thus partially chlorinated ether to chloral proceeds slowly. As a result of such observations, we have discovered as an important feature of the invention that a two-stage operation involving (1) continuous partial (35 to 65%) chlorination of the ether starting material to provide an intermediate material comprising a mixture containing chiefly dichloracetaldehyde alcoholate with small amounts of other compounds including monochloracetaldehyde alcoholate and (2) batch chlorination of the thus partially chlorinated ether to chloral utilizing the principles of the invention, is eminently suited to commercial large scale production of chloral. Practice of the aforesaid two-stage procedure results in more efficient operation leading to higher capacities, lower chlorine consumption, consistently high yields and smoother overall operation. Stage (1) involves the feature of introducing ether starting material, chlorine and water, under the conditions above specified for production of dichloracetaldehyde alcoholate, into a solvent of the type noted above to produce a reaction mixture containing the products of partial chlorination of the ether starting material, such reaction mixture being continuously removed from the reaction zone. The stage (2) feature is carried out by passing chlorine into the crude reaction mixture obtained from stage (1), the reaction mixture containing certain hereinafter specified proportions of water.

In typical preferred operation of the above process utilizing, for example, chloral in the form of chloral hydrate as solvent, the solvent is preferably first saturated with chlorine, and diethyl ether, chlorine and water in a ratio of 3 to 7 mols of chlorine and 1 to 2 mols of water per mol of ether are continuously passed into the solvent. Temperature of reaction preferably ranges from 75° to 95° C., the reaction mixture being continuously agitated in any of the alternative ways above described. The crude reaction mixture containing the products thus produced by partial chlorination of diethyl ether is continuously withdrawn as product from the first stage chlorinator. Once the reaction is under way most of the chloral originally employed as solvent will have been withdrawn from the reaction zone with the crude reaction mixture containing the products of partial chlorination of diethyl ether, leaving as the body of solvent into which the diethyl ether, chlorine and water are thereafter continuously introduced, a mixture of the chlorinated compounds produced by the partial chlorination of the ether in the reaction. The chlorinated compounds formed by partial chlorination of the ether in stage (1) comprise predominantly dichloracetaldehyde alcoholate along with smaller quantities of monochloracetaldehyde alcoholate, chloral alcoholate and dichloracetaldehyde. It is noted that all of these compounds are included above among the solvents applicable in the instant process.

To the crude reaction mixture withdrawn from stage (1) chlorination is added sufficient water to bring the total water input to from 2 to 5 mols per mol of ether initially transformed to the crude reaction product of stage (1). This roughly corresponds to a proportion of 2 to 5 mols of water per mol of chlorinated acetaldehyde alcoholates to which the ether was essentially converted in the first stage. To accomplish this purpose it is usually necessary to add to the reaction mixture withdrawn as product from stage (1), from about 1 to 3 mols of water per mol of such ether starting material initially chlorinated, corresponding to about 1 to 3 mols of water per mol of chlorinated acetaldehyde alcoholates present in the reaction mixture. Chlorine is then introduced into the reaction mixture which is maintained at a temperature preferably within the range 75°–95° C., for a period generally of about 30–40 hours, the reaction mixture being agitated during such addition. The total quantity of chlorine employed in stages (1) and (2) is at least 8, usually 8 to 10, mols per mol of ether starting material.

In both the first and second chlorination stages the reaction is usually carried out under reflux to permit escape of HCl and excess chlorine along with small amounts of ethyl chloride as by-product without excessive loss of water, ether starting material and chlorinated reaction products.

Chloral may be separated from the second stage reaction mixture by distillation at normal pressure up to a temperature of about 100° C. in the manner described above, leaving any higher boiling compounds such as small amounts of by-product chlorinated acetic acids as still residue.

While we have found it to be highly advantageous to initially produce a crude reaction mixture comprising chiefly dichloracetaldehyde alcoholate in continuous fashion in accordance with the stage (1) procedure described above, such mixture containing water added in the first stage then being introduced directly into the second stage for additional chlorination of the first stage reaction products to chloral, we have found it possible to start with dichloracetaldehyde alcoholate produced in any manner and which may or may not contain water, and chlorinate this compound to obtain chloral by adding sufficient water to the dichloracetaldehyde alcoholate either before or during introduction of chlorine to furnish from about 1 to 4 mols of water per mol of aldehyde alcoholate. The second stage operation for chlorination of dichloracetaldehyde alcoholate to chloral in the presence of 1 to 4, preferably about 2, mols of water per mol of aldehyde alcoholate is thus considered another feature of the invention.

The chlorination equipment employed in the instant process may be glass lined or porcelain lined.

The following examples are illustrative of the invention, the quantities noted therein being expressed in parts by weight:

*Example 1.*—To 300 parts of chloral hydrate as solvent are gradually added chlorine and 213 parts of diethyl ether, an excess of chlorine being passed into the solvent. 99 parts of water, corresponding to a ratio of about 1.9 mols of water per mol of diethyl ether, are simultaneously added to the reaction mixture maintained at about 80° C. during the reaction period. 915 parts of crude reaction product are obtained containing about 72% chloral, corresponding to a 46% yield based on diethyl ether.

*Example 2.*—Chlorination of diethyl ether is carried out in the same manner as in Example 1, except that 184 parts of diethyl ether and about 129 parts of water, amounting to about 2.9 mols of water per mol of diethyl ether, are employed. 1015 parts of crude reaction mixture are obtained containing about 75% chloral, corresponding to a 66% yield based on diethyl ether.

*Example 3.*—The same chlorination procedure is employed as in Example 1, except that 163 parts of diethyl ether and 131 parts of water are utilized, corresponding to a ratio of about 3.3 mols of water per mol of diethyl ether. About 967 parts of the crude reaction mixture are obtained containing 76% chloral, corresponding to a 72% yield based on diethyl ether.

*Example 4.*—655 parts of crude chloral hydrate containing 75% chloral as solvent are charged into a reaction vessel. The solvent is heated to 80° C. and saturated with chlorine. 356 parts of diethyl ether, 2250 parts of chlorine and 203 parts of water are then added gradually to the reaction mixture over a period of 8½ hours. The proportions of reactants thus introduced amount to about 6.6 mols of chlorine and 2.3 mols of water per mol of diethyl ether. During this time the temperature of the reaction mixture is maintained at 80° C. by cooling. After ether addition is complete chlorination is continued for a period of about 25 hours, introducing about 2840 parts of additional chlorine into the reaction mixture at a rate sufficient to keep the solution nearly saturated, while also adding 72 parts of water during this period. The additional chlorine and water thus introduced during the 25 hour period correspond to a ratio of about 8.3 mols of chlorine and 0.8 mol of water per mol of diethyl ether, giving a total of 3.1 mols of water added per mol of diethyl ether. The reaction mixture is heated during the additional chlorination period to maintain the reaction temperature at 80° C. The reaction is carried out under reflux at about 0° C. or below to permit the off-gases containing HCl, excess chlorine and low boiling by-product material such as ethyl chloride to pass out of the reaction zone while returning water, diethyl ether and higher boiling reaction products, e. g. chloral, to the reaction mass. 1988 parts of crude chloral reaction product mixture are obtained containing chloral in a yield of about 71% based on diethyl ether. A portion of the crude reaction mixture containing chiefly chloral may be used as solvent for a succeeding run.

*Example 5.—Stage one.*—In commencing operation 546 parts of chloral hydrate are employed as solvent. The temperature of the solvent is maintained at 90°–95° C. while diethyl ether, chlorine and water are continuously and simultaneously fed into the reactor in a proportion of about 17 parts of diethyl ether, 79 parts of chlorine and 5 parts of water, corresponding to a ratio of about 4.9 mols of chlorine and 1.1 mols of water per mol of diethyl ether. The reaction mixture containing the partially chlorinated diethyl ether reaction products, comprising a mixture containing essentially dichloracetaldehyde alcoholate and a small amount of other compounds such as monochloracetaldehyde alcoholate, is continuously drawn off from the reaction vessel at a rate of about 43 parts per hour. After chlorination is under way and is running continuously, substantially all of the chloral employed originally as solvent has been drawn off, the solvent now in the reaction mixture comprising essentially the above noted products of partial chlorination of diethyl ether in the reaction. Off-gases containing HCl, excess chlorine and some ethyl chloride are removed from the reaction zone under reflux at about 0° C. or below.

*Stage two.*—483 parts of crude reaction product mixture from the partial chlorination of diethyl ether in stage (1), and 86 parts of water are charged to a reactor. The water thus added corresponds to about 1.9 mols per mol of diethyl ether chlorinated in stage (1), bringing the total water input up to about 3 mols per mol of diethyl ether starting material. The reactor is then heated to 80°–90° C. and about 608 parts of chlorine, amounting to about 3.3 mols per mol of diethyl ether starting material, are gradually introduced into the reaction mixture over a period of about 35 hours. Total chlorine input in stages (1) and (2) was about 8.2 mols per mol of diethyl ether. Off-gases containing essentially HCl, excess chlorine and ethyl chloride are removed under reflux. 727 parts of crude reaction product are obtained containing chloral in a yield of about 75% based on diethyl ether.

The above examples show that chloral in relatively high yield is obtainable when the chlorination of ether is carried out in accordance with the hereindescribed principles of the invention. Example 5 indicates that under the preferred operating conditions of two-stage procedure involving continuous partial chlorination of the ether in stage (1) to produce essentially dichloracetaldehyde alcoholate, followed by final batch chlorination in stage (2) of the partially chlorinated reaction products of stage (1), high yields of chloral on the order of 75% with economical consumption of chlorine may be realized.

Since various changes and modifications may be made in the invention without departing from the spirit thereof, the invention is to be taken as limited only by the scope of the appended claims.

We claim:
1. The process of chlorinating diethyl ether which comprises: adding diethyl ether and chlorine and 1–5 mols of water per mol of diethyl ether to a chlorine-saturated reaction mixture at 50°–130° C.; and maintaining in the reaction mixture initially and throughout the chlorination period a solvent consisting of at least one chlorinated oxy ethane compound having not more than 6 carbon atoms, the introduction of water being controlled to maintain in the reaction mixture throughout the chlorination period a proportion of 0.5 to 5 mols of water per mol of chlorinated oxy ethane compounds, the organic materials of the reaction mixture consisting solely of ether reactant, by-products of ether chlorination and said solvent.

2. The process of making dichloracetaldehyde alcoholate which comprises adding diethyl ether, chlorine and water in a ratio of 3–7 mols of chlorine and 1–5 mols of water per mol of diethyl ether to a chlorine-saturated reaction mixture at 60°–110° C.; and maintaining in the reaction mixture initially and throughout the chlorination period a solvent consisting of at least one chlorinated oxy ethane compound having not more than 6 carbon atoms, the introduction of water being controlled to maintain in the reaction mixture throughout the chlorination period a proportion of 0.5 to 3 mols of water per mol of chlorinated oxy ethane compounds, the organic materials of the reaction mixture consisting solely of ether reactant, by-products of ether chlorination and said solvent.

3. The process of making chloral which comprises adding diethyl ether, chlorine and water in a ratio of at least 8 mols of chlorine and 2–4 mols of water per mol of diethyl ether gradually in a period of about 20–50 hours to a chlorine-saturated reaction mixture at 60°–110° C.; and maintaining in the reaction mixture initially and throughout the chlorination period a solvent consisting of at least one chlorinated oxy ethane compound having not more than 6 carbon atoms, the introduction of water being controlled to maintain in the reaction mixture throughout the chlorination period a proportion of 0.5 to 3 mols of water per mol of chlorinated oxy ethane compounds, the organic materials of the reaction mixture consisting solely of ether reactant, by-products of ether chlorination and said solvent.

4. The process of making chloral which comprises: as a first stage of chlorination adding diethyl ether, chlorine, and water in a ratio of 3 to 7 mols of chlorine and 1 to 2 mols of water per mol of diethyl ether continuously to a chlorine-saturated first stage reaction mixture at 50–130° C., maintaining at all times in the first stage reaction mixture a solvent consisting of at least one chlorinated oxy ethane compound having not more than 6 carbon atoms, and continuously collecting the crude first stage reaction product, the introduction of water being controlled to maintain a proportion of 0.5–3 mols of water per mol of chlorinated oxy ethane compounds in the first stage reaction mixture, the organic materials of the first stage reaction mixture consisting solely of ether reactant, by-products of ether chlorination and said solvent; establishing total water input to the process at 2–5 mols per mol of ether initially transformed to the crude first stage reaction product by adding to the collected first stage reaction mixture 1–3 mols of water per mol of ether starting material initially chlorinated, subjecting said crude first stage reaction product to additional chlorination with chlorine at 50°–130° C., and recovering chloral as product therefrom.

5. The process of claim 4 wherein the temperature in each stage is maintained at 75°–95° C.; the solvent in the first stage comprises essentially dichloracetaldehyde and monochloracetaldehyde alcoholates, principally the dichloro compound; and the total quantity of chlorine employed in the process is at least 8 mols per mol of diethyl ether fed thereto.

References Cited in the file of this patent
UNITED STATES PATENTS

| Number | Name | Date |
| --- | --- | --- |
| 2,443,183 | Cass | June 15, 1948 |
| 2,478,152 | Cass | Aug. 2, 1949 |
| 2,478,741 | Brothman | Aug. 9, 1949 |
| 2,552,934 | Cave et al. | May 15, 1951 |
| 2,615,049 | Pianfetti et al. | Oct. 21, 1952 |

FOREIGN PATENTS

| Number | Country | Date |
| --- | --- | --- |
| 612,396 | France | Oct. 22, 1926 |

OTHER REFERENCES

Richter: "Organic Chemistry," vol. I, Elsevier Pub. Co., N. Y. (1947), pages 238–239.